United States Patent
Yang (10) Patent No.: US 8,532,482 B2
(45) Date of Patent: Sep. 10, 2013

(54) METHOD AND APPARATUS FOR DETECTING PASSIVE OPTICAL NETWORK FAILURES, AND PASSIVE OPTICAL NETWORK SYSTEM THEREOF

(75) Inventor: Sulin Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 730 days.

(21) Appl. No.: 12/498,906

(22) Filed: Jul. 7, 2009

(65) Prior Publication Data

US 2009/0269053 A1     Oct. 29, 2009

Related U.S. Application Data (63) Continuation of application No. PCT/CN2008/070818, filed on Apr. 26, 2008.

(30) Foreign Application Priority Data

Apr. 26, 2007  (CN) .......................... 2007 1 0098058

(51) Int. Cl.
   *H04B 10/08*  (2011.01)
   *H04B 17/00*  (2006.01)

(52) U.S. Cl.
   USPC ................. 398/17; 398/10; 398/22; 398/23; 398/24; 398/25; 398/38

(58) Field of Classification Search
   USPC ................. 398/9, 10, 13, 17, 20, 22, 23, 24, 398/25, 28, 30, 33, 35, 38
   See application file for complete search history.

(56) References Cited

U.S. PATENT DOCUMENTS

| 2004/0156635 A1 | 8/2004 | Felske et al. |
| 2005/0019031 A1* | 1/2005 | Ye et al. ........................ 398/19 |
| 2005/0111843 A1* | 5/2005 | Takeuchi et al. ............. 398/38 |
| 2006/0221841 A1* | 10/2006 | Lee et al. ...................... 370/242 |

(Continued)

FOREIGN PATENT DOCUMENTS

| CN | 1479477 A | 3/2003 |
| CN | 1555139 A | 12/2004 |

(Continued)

OTHER PUBLICATIONS

International Telecommunication Union, "Broadband Optical Access Systems Based on Passive Optical Networks", Jan. 2005, G.983.1, pp. 1-116.*

Written Opinion of the International Searching Authority in corresponding PCT Application No. PCT/CN2008/070818 (Aug. 7, 2008).

(Continued)

*Primary Examiner* — Danny Leung
*Assistant Examiner* — Daniel Dobson
(74) *Attorney, Agent, or Firm* — Leydig, Voit & Mayer, Ltd.

(57) ABSTRACT

A method and apparatus for detecting Passive Optical Network (PON) failures, and a PON system are provided to obtain the monitoring information of a peer device before a PON system failure occurs. The method includes: obtaining monitoring information of an Optical Line Terminal (OLT) and an Optical Network Unit (ONU); and determining a failure of a passive ONU according to the obtained monitoring information of the OLT and the ONU. The monitoring information of the peer device is obtained before a PON system failure occurs. Thus the failure is discovered in time, quick troubleshooting is ensured, and the costs of system maintenance are reduced.

6 Claims, 10 Drawing Sheets

(56) References Cited

U.S. PATENT DOCUMENTS

| | | |
|---|---|---|
| 2007/0036545 A1* | 2/2007 | Lautenschlager ............... 398/33 |
| 2007/0201867 A1* | 8/2007 | DeLew et al. ................... 398/38 |
| 2008/0089686 A1* | 4/2008 | Kazawa et al. ................. 398/71 |

FOREIGN PATENT DOCUMENTS

| | | |
|---|---|---|
| CN | 1703008 | 11/2005 |
| CN | 1750495 | 3/2006 |
| JP | 2007027819 | 2/2007 |
| KR | 20050028460 | 3/2005 |

OTHER PUBLICATIONS

International Search Report in corresponding PCT Application No. PCT/CN2008/070818 (Aug. 7, 2008).

1st Office Action in corresponding Chinese Application No. 200710098058.4 (Aug. 18, 2011).

Cao et al., "Optical Power Real-Time Supervision for Optical Cable," Study on Optical Communications, Feb. 2003, China Academic Journal Electronic Publishing House, Beijing, China.

Extended European Search Report in corresponding European Patent Application No. 08734176.4 (Jun. 21, 2013).

\* cited by examiner

METHOD AND APPARATUS FOR DETECTING PASSIVE OPTICAL NETWORK FAILURES, AND PASSIVE OPTICAL NETWORK SYSTEM THEREOF

CROSS-REFERENCE TO RELATED APPLICATIONS

This application is a continuation of International Patent Application No. PCT/CN2008/070818, filed on Apr. 26, 2008, which claims priority to Chinese Patent Application No. 200710098058.4, filed on Apr. 26, 2007, both of which are hereby incorporated by reference in their entireties.

FIELD OF THE INVENTION

The present invention relates to a communication technology, and in particular, to a method and apparatus for detecting Passive Optical Network (PON) failures, and a PON system.

BACKGROUND OF THE INVENTION

Optical access networks are booming currently. Compared with a point-to-point optical access network, a point-to-multipoint optical access network, that is, PON, slashes the network construction costs because a PON central office may divide one fiber into scores of fiber channels or even more channels connected to users. Currently, the representative PON technologies are Gigabit Passive Optical Network (GPON) and Ethernet Passive Optical Network (EPON). The GPON technology is characterized by high line rates and perfect maintenance and management functions.

The fiber network failures of the PON system include: Optical Distribution Network (ODN) failures, laser transceiver failures, Optical Line Terminal (OLT) failures, and Optical Network Unit (ONU) failures. The ODN failures include: fiber break, connection failure, and increasing attenuation caused by bend. Connection failures include: connector looseness, and contamination of connector terminal face.

In the prior art, the method for detecting PON failures is as follows: For the failures that can disappear automatically soon, for example, temporary bend of the fiber, after the normal communication between the OLT and the ONU is recovered, the OLT may obtain the monitoring information automatically, or the Operation and Maintenance (OM) technicians may use control commands to read the monitoring information recorded by the ONU. The failure causes are analyzed based on the monitoring information. The monitoring information includes: device status, device temperature, and optical power. For the failures that cannot disappear automatically soon, for example, permanent extrusion of the fiber, technicians need to be dispatched to locate and remove the failures. After the failures are removed and the normal communication between the OLT and the ONU is recovered, the OLT may obtain the monitoring information or the OM technicians may use control commands to read the monitoring information recorded by the ONU. The failure causes are analyzed based on the monitoring information.

In the process of implementing the present invention, the inventor finds at least the following defects in the prior art:

In the foregoing method for detecting PON failures, the monitoring information is obtained only after failures occur, and the failure causes are analyzed according to the monitoring information. Consequently, it is impossible to discover the failures in time or ensure quick troubleshooting. Especially for the failures that cannot disappear automatically soon, technicians need to be dispatched to analyze the failure causes and remove the failures, thus leading to high OM costs of the PON system.

SUMMARY OF THE INVENTION

A method and apparatus for detecting PON failures, and a PON system are provided in embodiments of the present invention so that monitoring information of the peer device can be obtained before the PON system fails. Therefore, failure analysis can be performed according to the monitoring information; the failure is discovered in time; quick troubleshooting is ensured; and the system maintenance costs are reduced.

A method for detecting PON failures is provided in an embodiment of the present invention. The method includes: obtaining monitoring information of an OLT and an ONU; and determining a failure of a passive ONU according to the obtained monitoring information of the OLT and the ONU.

An OLT is provided in an embodiment of the present invention. The OLT includes a failure detection apparatus. The failure detection apparatus includes: a receiving unit, configured to obtain monitoring information of at least one OLT; and an exception monitoring unit, configured to determine a PON failure according to the monitoring information of the ONU and the obtained monitoring information of the OLT.

A failure detection system is provided in an embodiment of the present invention. The system includes an ONU and the foregoing OLT. The ONU is configured to send monitoring information of the ONU to the OLT. The OLT is configured to determine a PON failure according to the monitoring information of the OLT and the obtained monitoring information of the ONU.

An ONU is provided in an embodiment of the present invention. The ONU includes a failure detection apparatus. The failure detection apparatus includes: a receiving unit, configured to obtain monitoring information of an OLT; and an exception monitoring unit, configured to determine a PON failure according to the monitoring information of the ONU and the obtained monitoring information of the OLT.

A failure detection system is provided in an embodiment of the present invention. The system includes an OLT and the foregoing ONU. The OLT is configured to send monitoring information of the OLT to the ONU.

A network management device is provided in an embodiment of the present invention. The network management device includes: a receiving unit, configured to obtain monitoring information of an OLT and an ONU; and an exception monitoring unit, configured to determine a PON failure according to the obtained monitoring information of the OLT and the monitoring information of the ONU.

A failure detection system is provided in an embodiment of the present invention. The system includes an OLT, an ONU, and the foregoing network management device. The OLT is configured to send monitoring information of the OLT to the network management device. The ONU is configured to send monitoring information of the ONU to the network management device.

A failure detection system is provided in an embodiment of the present invention. The system includes an OLT, an ONU, and an exception analysis apparatus. The OLT is configured to send monitoring information of the OLT to the exception analysis apparatus. The ONU is configured to send monitoring information of the ONU to a network management device. The exception analysis apparatus is configured to analyze a PON system failure according to the obtained monitoring information of the ONU and the monitoring information of the OLT.

A computer-readable product is provided in an embodiment of the present invention. The product includes several instructions for executing the foregoing failure detection method.

According to the embodiments of the present invention, by monitoring the monitoring parameters of the OLT and the ONU respectively, the monitoring information of the peer device can be obtained, for example, the OLT obtains the monitoring information of the ONU, before a failure triggers communication interruption. Therefore, the PON system failure can be predicted and analyzed according to the monitoring information of the local device and the monitoring information of the peer device. In this way, the failure is discovered in time and removed quickly. Especially in some circumstances, for example, the failure cannot disappear automatically, manual analysis of the failure is avoided, and the OM costs of the PON system are slashed.

DETAILED DESCRIPTION OF THE INVENTION

The embodiments of the present invention are described below with reference to accompanying drawings.

Figure 1:
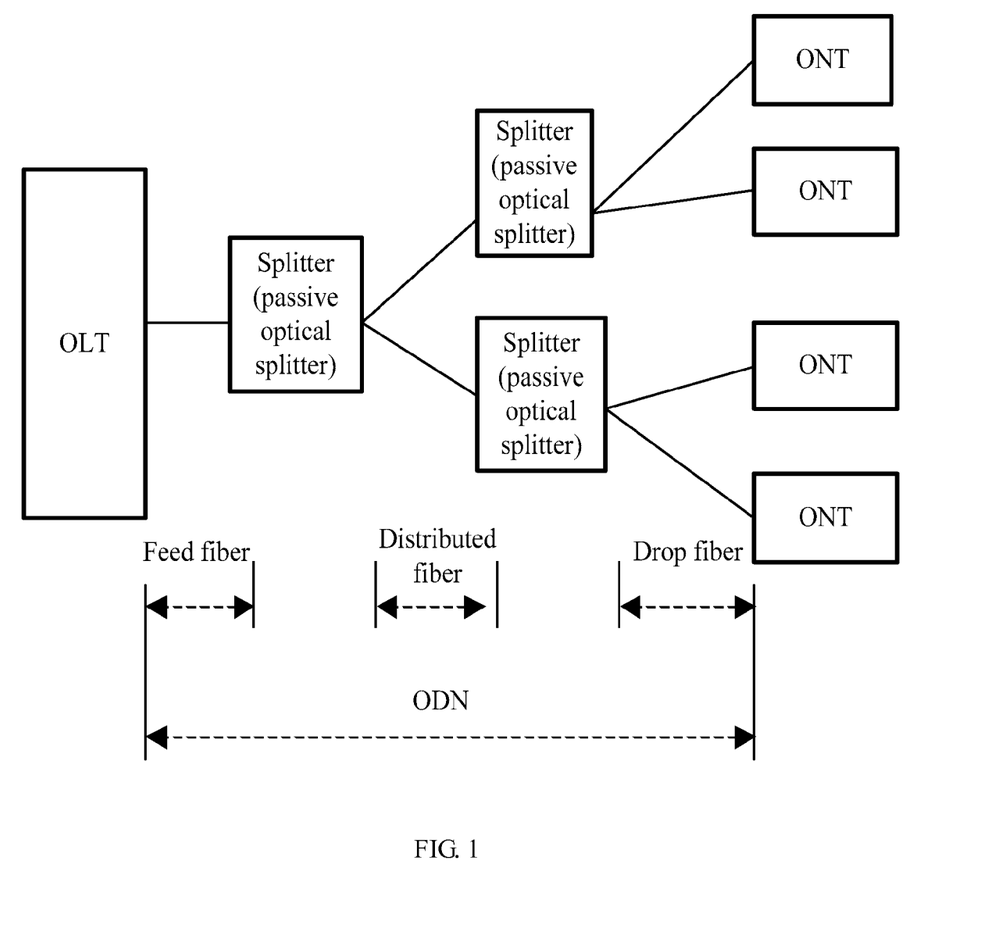
FIG. 1 is a schematic diagram of a PON system.

As shown in FIG. 1, a PON system applied in an embodiment of the present invention includes: an OLT, an ODN, and an ONU. The OLT provides a network interface for the PON system, and is connected to one or more ODNs. The ODN distributes the downlink data of the OLT to the ONUs through multiple channels, and collects the uplink data of multiple ONUs to the OLT. The user interface provided by the ONU for the PON system is connected to the ODN in the uplink direction. If the ONU provides user port functions directly, for example, the Ethernet user port for accessing the Internet on a PC, the ONU is known as an Optical Network Termination (ONT). Unless otherwise specified, the word "ONU" mentioned below is a collective term of ONUs and ONTs.

An ODN generally includes three parts: passive optical splitter, feed fiber, distributed fiber, and drop fiber, where the latter two are collectively called "tributary fiber". FIG. 1 shows a structure of an ODN that provides two levels of optical splitting. An ODN that provides only one level of optical splitting includes a feed fiber and drop fibers.

In a PON system in the prior art, the optical signals from the OLT to the ONU are called "downlink optical signals"; and the optical signals from the ONU to the OLT are called "uplink optical signals". For example, the uplink optical signals of the EPON and GPON systems have a 1310 nm wavelength, and the downlink optical signals have a 1490 nm wavelength. The uplink optical signals and the downlink optical signals may be transmitted on the same fiber (as shown in FIG. 1) or on different fibers. Downlink data is broadcast to the ONUs. Uplink data of each ONU is sent to the OLT in the transmission interval allocated by the OLT, namely, in Time Division Multiple Access (TDMA) mode.

Embodiment 1

When the PON system works normally, the variation of the transmit power of the laser in the ONU and the OLT and the variation of attenuation of the ODN never exceed a specific value. Therefore, the variation of the optical receive power of the transceiver never exceeds a threshold. When the variation of the receive optical power and/or the variation of attenuation exceeds a threshold, a failure is signified. That is, a failure is imminent. In this embodiment, the OLT needs to obtain the monitoring information of the ONU (or the ONU needs to obtain the monitoring information of the OLT). In this way, the OLT (ONU) can perform pre-analysis on the failure causes in view of the monitoring information of the OLT and the ONU, and discover and remove the failure as early as possible. Therefore, in some circumstances, for example, the failure cannot disappear automatically, manual analysis of the failure is avoided, and the OM costs of the PON system are slashed.

Figure 2:
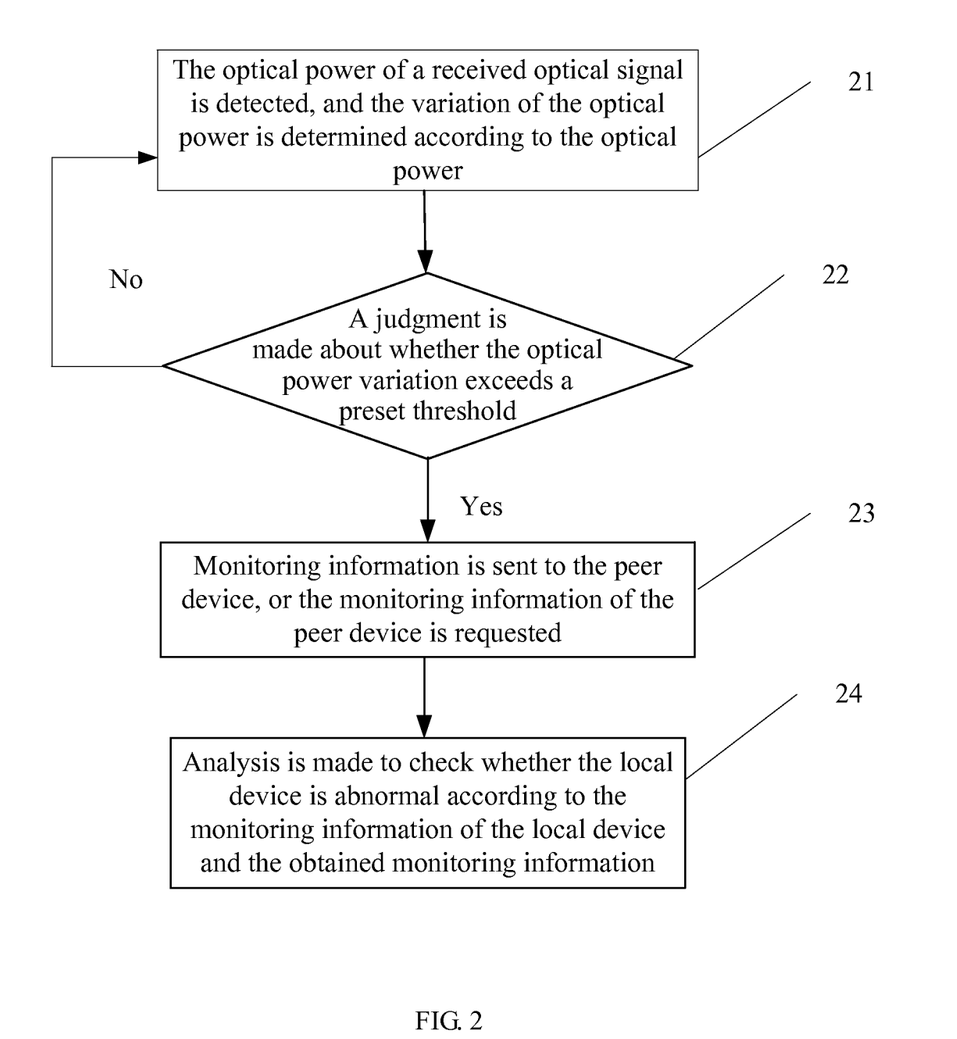
FIG. 2 is a flowchart of transmitting monitoring information in a first embodiment of the present invention.

A method for detecting PON failures is provided in an embodiment of the present invention. The method includes: obtaining monitoring information of an OLT and monitoring information of an ONU, and analyzing whether the PON is abnormal according to the monitoring information of the OLT and the ONU. As shown in FIG. 2, the method includes the following steps:

Step 21: The optical power of the received optical signal, namely, the receive optical power, is detected, and the variation of the optical power is determined according to the optical power; or the following information or any combination thereof is detected: transmit optical power of the laser, temperature, bias current, drive current, receive optical power, bit error rate, alarm information, and supply voltage.

The variation of optical power may be the variation of the receive optical power, namely, the absolute value of difference between the detected receive optical power and the reference receive optical power, or may be the variation of the optical attenuation, namely, the absolute value of difference between the optical attenuation (the absolute value of difference between the transmit optical power of the peer device and the detected receive optical power) and the standard optical attenuation. The reference receive optical power and the standard optical attenuation may be determined in the following way.

The reference receive optical power may be an average value of multiple measured values of the receive optical power measured when the PON system is normal or calibrated. The optical power of the detected received signal is impacted by the transmit optical power of the peer device (an OLT or ONU). To eliminate the impact caused by normal adjustment of the optical power of the peer device, the transmit optical power of the local device may be notified to the peer device after the ONU and the OLT work normally, namely, after the ONU and the OLT are activated and registered successfully (because the transmit optical power of an ONU or OLT that works normally does not fluctuate sharply). Alternatively, after the transmit optical power is adjusted normally, the local adjusted optical power is notified to the peer device through an Operations, Administration, and Maintenance (OAM) message. For example, after the OLT adjusts the downlink transmit optical power, the OLT sends an OAM message to the ONU, indicating the adjusted optical power. After receiving the OAM message about the adjusted optical power of the OLT, the ONU adjusts the reference receive optical power according to the adjusted optical power. After the transmit optical power of a laser at the ONU side is adjusted, the adjustment may be notified to the OLT through an OAM message. Therefore, the OLT can adjust the reference receive optical power according to the adjusted optical power.

The standard optical attenuation may be an average of multiple measured optical attenuation values. The optical attenuation is the transmit optical power of the peer device minus the receive optical power detected locally. The transmit optical power of the peer device may be obtained through an OAM message, for example, an MPC PDU packet or OAM PDU packet in the EPON, or a PLOAM message or OMCI message in the GPON.

Step 22: A judgment is made about whether the variation of the optical power or the variation of other parameters exceeds a preset threshold. If so, the process proceeds to step 23; otherwise, the process returns to step 21.

The threshold is a preset value which is flexibly configurable. Taking the receive optical power as an example, the receive optical power may be set according to the normal adjustment range of the optical power. If the normal adjustment range of the optical power does not exceed 3 dB, the default threshold may be set to 3 dB. The threshold may be set by the network management device or the OLT device in the PON system. For example, the monitoring threshold on the ONU may be set through an OAM message. Specifically, the ONU is set through an MPC PDU packet or an OAM PDU packet in the EPON; and the OLT in the GPON sets the threshold of the ONU through a PLOAM message or an OMCI message. The threshold on the ONU may be configured remotely or locally. The threshold on the OLT may be set through a Command Line Interface (CLI) or remote configuration.

Step 23: The monitoring information of the local device is sent to the peer device, or a request is sent to the peer device to request the monitoring information of the peer device. The monitoring information includes the following information or any combination thereof: transmit optical power of the laser, temperature, bias current, drive current, receive optical power, bit error rate, and alarm information.

Figure 3:
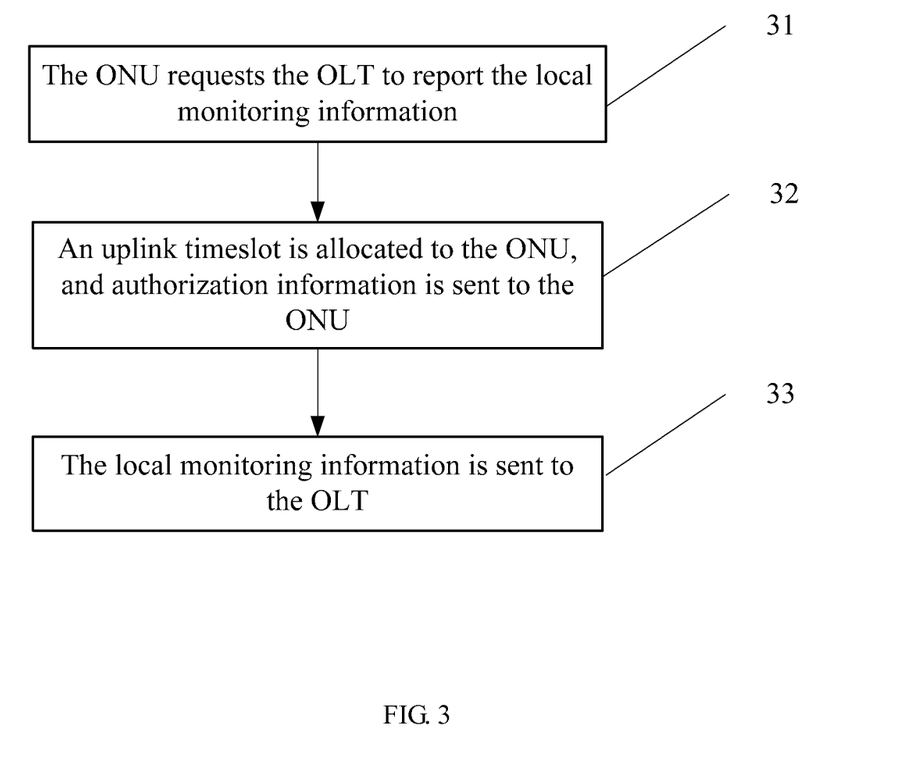
FIG. 3 is a flowchart of sending monitoring information from an ONU to an OLT in the first embodiment of the present invention.

If the current device is an ONU, the peer device is an OLT. As shown in FIG. 3, the process of sending local monitoring information to the peer device includes the following steps:

Step 31: The ONU sends a request to the OLT, requesting to transmit the monitoring information of the ONU.

Step 32: After receiving the request, the OLT allocates an uplink timeslot to the ONU for transmitting the monitoring information of the ONU, and then sends authorization information to the ONU.

Step 33: After receiving the authorization information, the ONU sends the monitoring information of the ONU to the OLT.

Figure 4:
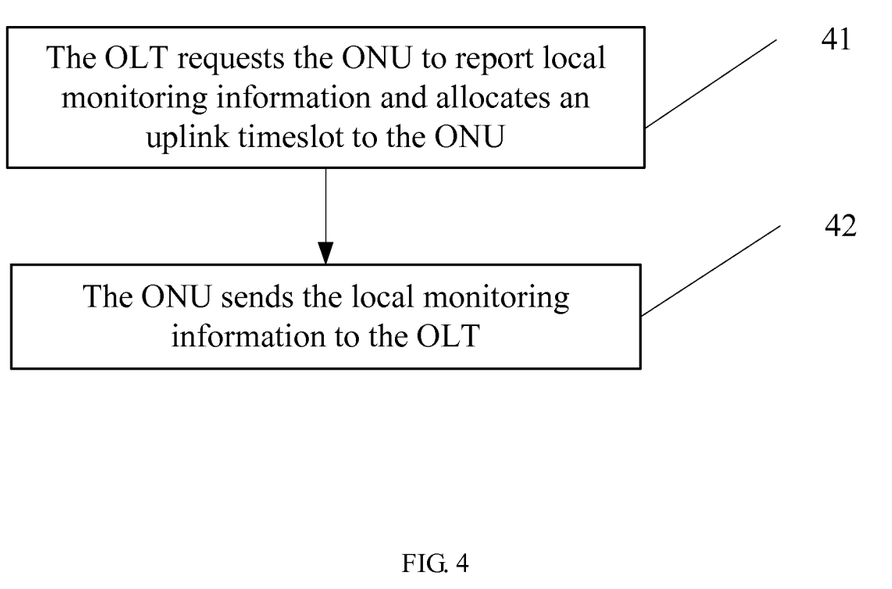
FIG. 4 is a flowchart of an OLT requesting monitoring information from an ONU in the first embodiment of the present invention.

Supposing the current device is an OLT and the peer device is an ONU, as shown in FIG. 4, the process of requesting the peer device to send monitoring information includes the following steps:

Step 41: The OLT sends a request to the ONU, requesting the ONU to report the local monitoring information; and allocates an uplink timeslot to the ONU.

Step 42: After receiving the request, the ONU organizes the local monitoring information, and sends the local monitoring information to the OLT through the uplink timeslot.

In this way, before the failure triggers communication interruption, the OLT can obtain the monitoring information of the ONU, and analyze the failure in view of the monitoring information of the OLT and the ONU as early as possible, thus reducing manual operations and slashing OM costs.

If the current device is an ONU and the peer device is an OLT, the process of requesting monitoring information of the peer device includes the following steps: The ONU sends a request to the OLT, requesting the OLT to send the local monitoring information of the OLT to the ONU; after receiving the request, the OLT sends the local monitoring information to the ONU through a downlink frame.

If the current device is an OLT and the peer device is an ONU, the process of sending the local monitoring information to the peer device is: The OLT sends the local monitoring information to the ONU through a downlink frame.

Step 24: The local device analyzes whether the PON system is abnormal according to both the monitoring information of the local device and the monitoring information of the peer device, or according to the monitoring information of the peer device alone.

It takes some time for a failure to occur. For example, when the ODN and/or the laser transceiver fails, the bit error rate of the data increases due to increase of the optical attenuation. Therefore, the exception of the PON system may be detected according to the bit error rate in the monitoring information. Alternatively, when the ODU and/or the laser transceiver fails, the optical power in the monitoring information decreases. Therefore, the exception of the PON system may be detected according to the optical power in the monitoring information, as detailed below:

Embodiment 1-1

Through the transmit optical power and the receive optical power monitored in the uplink and downlink directions, the optical attenuation of the uplink and downlink signals may be calculated out. According to the variation of the optical attenuation, a connection failure or bend is determined. When the optical attenuation increases, if the variation of the optical attenuation of the downlink signal is far greater than that of the uplink signal, for example, over 0.5 dB higher, the failure is determined as a bend; if the difference between them is small, for example, less than 0.1 dB, the failure is determined as a connection failure.

Embodiment 1-2

If the transmit optical power decreases but the bias current and/or drive current of the laser remains unchanged, it is determined that the laser fails. If the drive current and/or bias current of the laser increases but the transmit optical power does not change obviously, it is determined that the laser has aged.

Embodiment 1-3

If the transmit optical power is unchanged but the receive optical power decreases, it is determined that the attenuation of the ODN has increased.

Embodiment 1-4

If both the receive optical power and the peer transmit optical power are normal but the receive bit error rate increases, it is determined that the local receiver or the peer transmitter fails. For example, the receive optical power on the OLT is normal, and the transmit optical power of all peer ONUs is normal, but the bit error rate of the uplink data of only one ONU increases. In this case, it is determined that the transmitter of this ONU fails. If the bit error rate of the uplink data of all ONUs increases, it is determined that the receiver of the OLT fails.

Embodiment 1-5

The fiber section where the failure occurs may be determined according to the optical attenuation of the uplink/downlink signal between the OLT and multiple ONUs and/or the variation of the optical attenuation. If the optical attenuation of the uplink/downlink optical signal of the OLT and/or the variation of the optical attenuation is the same or almost the same as that of all ONUs, it is determined that the feed fiber fails (including connection failure and bend). If the uplink/downlink optical attenuation and/or the variation of the optical attenuation on a link has changed (this link covers one or more ONUs that are not on the same distributed fiber), it is determined that the drop fiber section that covers the ONUs fails (including connection failure and bend). If the uplink/downlink optical attenuation and/or the variation of the optical attenuation on a link has changed to a similar or identical extent (this link covers all ONUs connected to the same distributed fiber section), it is determined that the distributed fiber section fails (including connection failure and bend).

In this embodiment, the current device is an OLT and the peer device is an ONU. If the OLT obtains the local monitoring information of the ONU, the monitoring information of the ONU and the OLT may be transmitted to the network management device of the PON system or a stand-alone detection apparatus. The network management device of the PON system or the stand-alone detection apparatus analyzes whether the PON system is abnormal. Alternatively, the network management device of the PON system or the stand-alone detection apparatus obtains the monitoring information of the OLT and the ONU from the OLT/ONU to analyze whether the PON system is abnormal. The network management device or the stand-alone detection apparatus may obtain the monitoring information of the OLT and the ONU in this way: The OLT and the ONU report the monitoring information actively; or, the network management device or the detection apparatus requests the monitoring information from the OLT and the ONU. Active reporting by the OLT and the ONU means that: Trigger conditions, such as the optical power threshold and bit error rate threshold, are set at the OLT and the ONU; when the monitoring information exceeds the threshold defined by the trigger conditions, the OLT and the ONU actively report the monitoring information to the network management device or the detection apparatus. The requesting by the network management device or the detection apparatus means that: The network management device or the detection apparatus requests the OLT and the ONU to report the monitoring information periodically, or requests the OLT and the ONU when a preset condition is fulfilled, or requests the OLT and the ONU directly according to a management instruction. According to the obtained optical power of the OLT and the ONU or the bit error rate, the network management device or the detection apparatus analyzes and checks whether the PON system is abnormal. The process and standard of analysis are the same as those described in step 24, and are not described further.

Alternatively, the local device may determine the failure according to the monitoring information of the peer device alone. For example, if the laser bias current reported by the ONU keeps increasing but the supply voltage is stable, the OLT determines that the drive part of the ONU laser fails. The detailed steps of this instance may be: The ONU reports the detected supply voltage and bias current of the laser to the OLT; the OLT obtains the variation of the bias current and the supply voltage of the ONU according to such parameter values reported by the ONU and the history statistic data of such parameters; and the OLT judges whether the ONU fails according to the variation. If the voltage is stable and the bias current keeps increasing massively, the laser of the ONU may have aged. The period may be selected as required, for example, 1 minute, 1 hour, 1 day, or 1 month.

The PON system failure may be a device failure or a line failure. The device failure may be: the laser transmitter fails, or the laser transmitter has aged, or the receiver fails. The line failure may be: the line connection fails, or the line is bent improperly.

Embodiment 2

Figure 5:
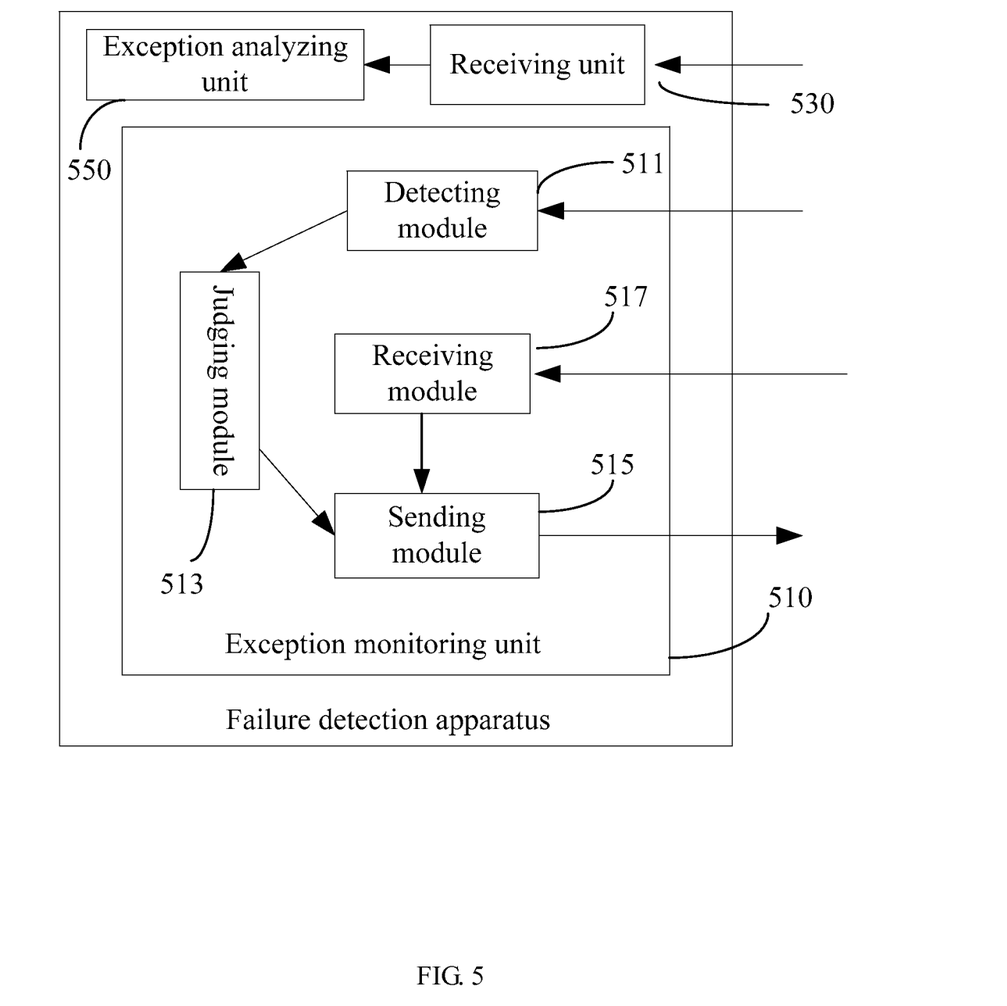
FIG. 5 shows a failure detection apparatus in a second embodiment of the present invention.

As shown in FIG. 5, a failure detection apparatus is provided in this embodiment. The failure detection apparatus includes: an exception monitoring unit 510, a receiving unit 530, and an exception analyzing unit 550. The exception monitoring unit 510 is configured to: detect the optical power of the received optical signal or the bit error rate of the received data (decrease of the optical power causes the bit error rate to increase, as described in embodiment 1), and determine whether to obtain the monitoring information of the peer device according to the detection result. The exception monitoring unit 510 includes a detecting module 511, which is configured to: detect the optical power of the received optical signal or detect the bit error rate, and determine the variation of the optical power according to the detected optical power or bit error rate. The detecting module may be an optical power meter or a bit error rate measuring unit. The detecting module may detect the following information or any combination thereof: transmit optical power of the laser, temperature, bias current, drive current, receive optical power, bit error rate, alarm information, and supply voltage. The exception monitoring unit 510 also includes a judging module 513, which is configured to: judge whether the optical power variation or the bit error rate determined by the detecting module 511 exceeds the threshold; and, if so, start or trigger a sending module 515. The exception monitoring unit 510 also includes a sending module 515, which is configured to send a monitoring information request to the peer device, requesting the peer device to send monitoring information. The monitoring information includes the following information or any combination thereof: transmit optical power of the laser, temperature, bias current, drive current, receive optical power, bit error rate, and alarm information. The failure detection apparatus may also include a receiving module 517, which is configured to: receive the monitoring information request from the peer device, and, upon receiving the request, notify the sending module 515 to send the monitoring information of the local device to the peer device.

The receiving unit 530 is configured to receive the monitoring information of the peer device. The exception analyzing unit 550 is configured to analyze whether the PON system is abnormal according to the monitoring information of the peer device received by the receiving unit 530 and the monitoring information of the local device.

An OLT is provided in an embodiment of the present invention. The OLT includes a failure detection apparatus illustrated in FIG. 5. The failure detection apparatus is configured to: obtain the monitoring information of the peer device (ONU) after detecting that the variation of the optical power or another parameter exceeds the preset threshold, and determine a PON system failure according to the monitoring information of the ONU and the OLT. The failure detection apparatus includes: an exception monitoring unit, a receiving unit, and an exception analyzing unit. The internal structures and functions of such units are the same as those illustrated in FIG. 5, and are not described further. This embodiment supposes that the PON system includes only one ONU. In practice, a PON system may include more than one ONU. In this case, the OLT analyzes whether the PON system is abnormal in view of the local monitoring information of the OLT and the monitoring information of multiple ONUs. The analysis may be made for the ONUs in turn, or by traversing the link on which each ONU is located, or by analyzing the links of multiple ONUs comprehensively before an analysis result is obtained. Those skilled in the art can easily work out a solution to the scenario of multiple ONUs according to this embodiment and the know-how in this field.

An ONU is provided in an embodiment of the present invention. The ONU includes a failure detection apparatus illustrated in FIG. 5. The failure detection apparatus is configured to: obtain the monitoring information of the peer device (OLT) after detecting that the variation of the optical power or another parameter exceeds the preset threshold, and determine a PON system failure according to the monitoring information of the OLT and the ONU. The failure detection apparatus includes: an exception monitoring unit, a receiving unit, and an exception analyzing unit. The internal structures and functions of such units are the same as those illustrated in FIG. 5, and are not described further.

Figure 6:
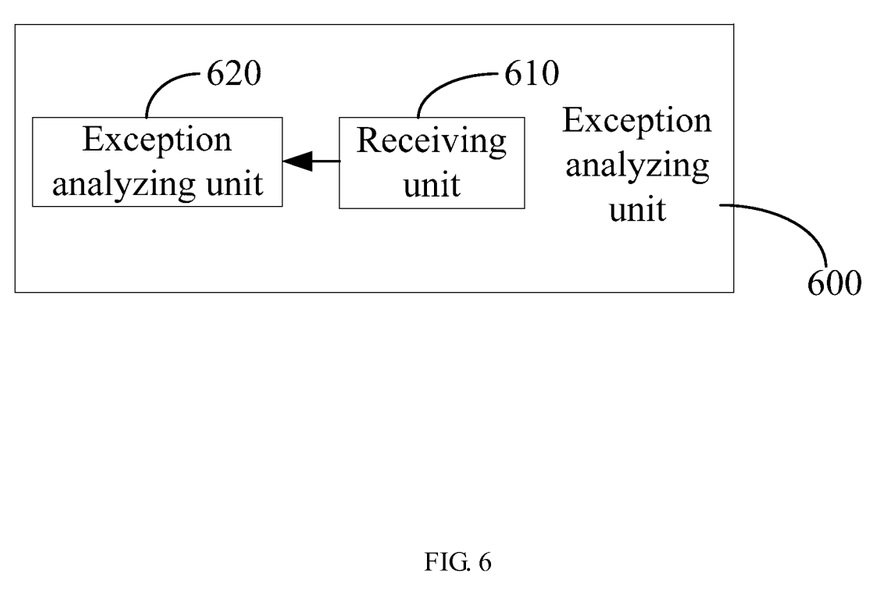
FIG. 6 shows a network management device in an embodiment of the present invention.

A failure detection device is provided in an embodiment of the present invention. As shown in FIG. 6, the device includes an exception analyzing unit 600. The exception analyzing unit 600 includes: a receiving unit 610, configured to receive monitoring information of the ONU and the OLT; and an exception analyzing unit 620, configured to analyze whether the PON system is abnormal according to the monitoring information of the OLT and the ONU received by the receiving unit 610. The failure detection device may obtain the monitoring information of the OLT and the ONU in this way: The OLT and the ONU report the monitoring information actively; or, the failure detection device requests the monitoring information from the OLT and the ONU. Active reporting by the OLT and the ONU means that: Trigger conditions, such as the optical power threshold and bit error rate threshold, are set at the OLT and the ONU; when the monitoring information exceeds the threshold defined by the trigger conditions, the OLT and the ONU actively report the monitoring information to the failure detection device. The requesting by the failure detection device means that: The network management device requests the OLT and the ONU to report the monitoring information periodically, or requests the OLT and the ONU when a preset condition is fulfilled, or requests the OLT and the ONU directly according to a management instruction. In the case that the failure detection device requests the monitoring information, the failure detection device may also include a judging unit (not illustrated in FIG. 6), which is configured to: judge whether a monitoring information request needs to be sent to the OLT and the ONU, and trigger the receiving unit 610 when necessary.

A network management device is provided in an embodiment of the present invention. The network management device is configured to: obtain the monitoring information of the OLT and the ONU in the PON system when necessary, and judge whether the PON system is abnormal according to the monitoring information of the OLT and the ONU and analyze the failure. As shown in FIG. 6, the network management device includes an exception analyzing unit 600. The exception analyzing unit 600 includes an exception analyzing unit 620 and a receiving unit 610. The implementation and functions of the units are the same as those of the failure detection device described above, and are not described further. The network management device may obtain the monitoring information of the OLT and the ONU in this way: The OLT and the ONU report the monitoring information actively; or, the network management device requests the monitoring information from the OLT and the ONU. Active reporting by the OLT and the ONU means that: Trigger conditions, such as the optical power threshold and bit error rate threshold, are set at the OLT and the ONU; when the monitoring information exceeds the threshold defined by the trigger conditions, the OLT and the ONU actively report the monitoring information to the network management device. The requesting by the network management device means that: The network management device requests the OLT and the ONU to report the monitoring information periodically, or requests the OLT and the ONU when a preset condition is fulfilled, or requests the OLT and the ONU directly according to a management instruction. In the case that the network management device requests the monitoring information, the failure detection device may also include a processing unit (not illustrated in FIG. 6), which is configured to: judge whether the OLT and the ONU need to send respective monitoring information; if so, send a request to the OLT and the ONU, where the request requires the OLT and the ONU to send respective monitoring information to the exception analyzing unit; and trigger the receiving unit 610.

Embodiment 3

Figure 7:
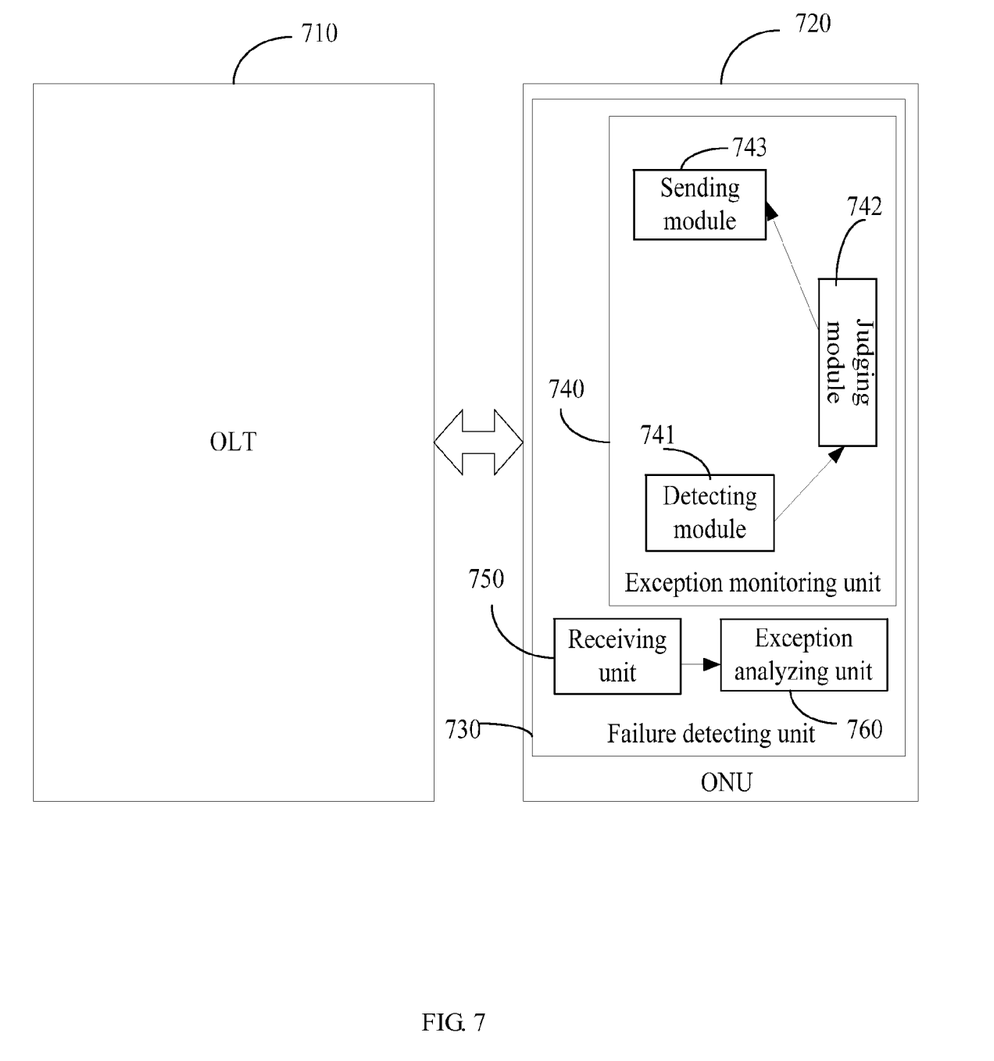
FIG. 7 shows a PON system in a third embodiment of the present invention.

As shown in FIG. 7, a PON system is provided in this embodiment. The PON system includes at least an OLT 710 and an ONU 720 (FIG. 7 shows only one OLT and one ONU as examples).

The ONU 720 may include a failure detecting unit 730. The failure detecting unit 730 includes an exception monitoring unit 740, a receiving unit 750, and an exception analyzing unit 760. The exception monitoring unit 740 is configured to: detect the optical power of the received optical signal or detect the bit error rate of the received data, and determine whether the monitoring information of the OLT needs to be obtained according to the detected optical power or bit error rate. The exception monitoring unit 740 includes a detecting module 741. The detecting module 741 may detect the following information or any combination thereof: transmit optical power of the laser, temperature, bias current, drive current, receive optical power, bit error rate, alarm information, and supply voltage. The detecting module 741 may be an optical power meter or a bit error rate measuring unit. When the detecting module 741 is an optical power meter, the detecting module 741 is configured to: detect the optical power of the optical signal from the OLT, and determine the variation of the optical power according to the detected optical power. When the detecting module 741 is a bit error rate measuring unit, the detecting module 741 is configured to: detect and measure the bit error rate, and calculate the change of the bit error rate. The exception monitoring unit 740 also includes a judging module 742, which is configured to judge whether the optical power variation determined by the detecting module 741 exceeds the threshold. If the detecting module 741 detects any other parameter, the judging module 742 is configured to judge whether the other parameter determined by the detecting module 741 exceeds the threshold. If the threshold is exceeded, the judging module 742 triggers a sending module 743. The sending module 743 is configured to send a monitoring information request to the OLT, requesting the OLT to send monitoring information of the OLT to the ONU. The monitoring information includes the following information or any combination thereof: transmit optical power of the laser, temperature, bias current, drive current, receive optical power, bit error rate, and alarm information.

The receiving unit 750 is configured to receive the monitoring information of the OLT. The exception analyzing unit 760 is configured to analyze whether the PON system is abnormal according to the monitoring information sent by the OLT and the monitoring information of the ONU.

Embodiment 4

Figure 8:
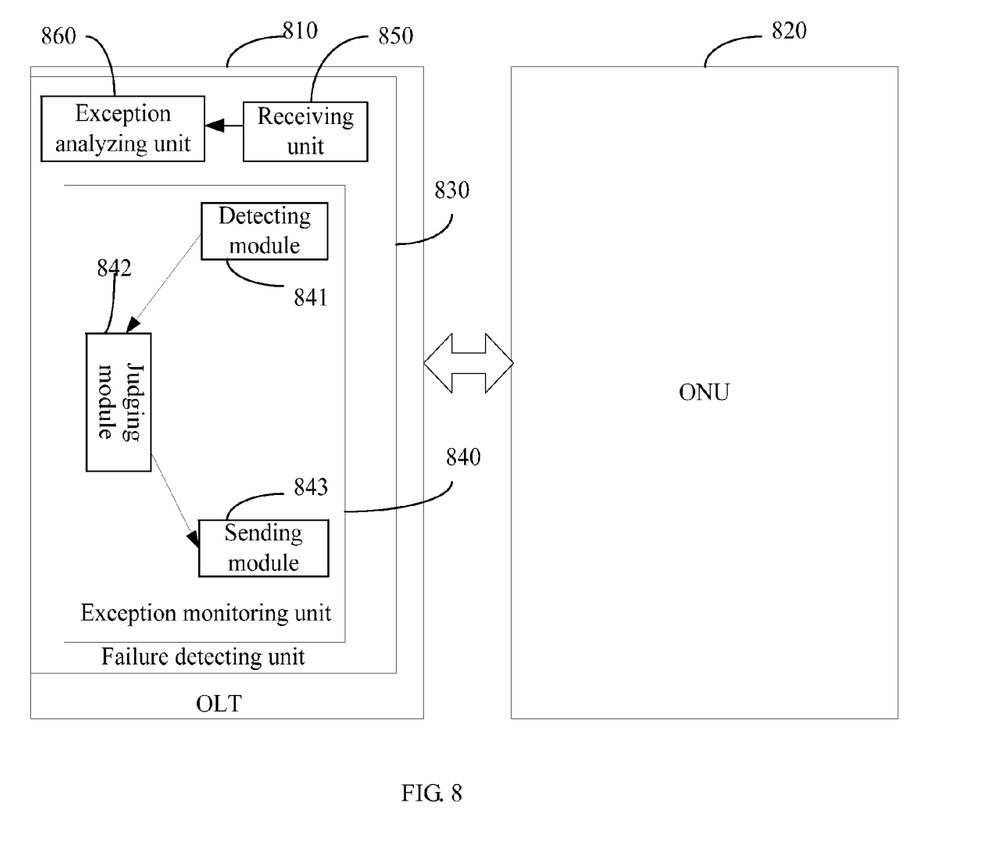
FIG. 8 shows a PON system in a fourth embodiment of the present invention.

As shown in FIG. 8, a PON system is provided in this embodiment. The PON system includes at least an OLT 810 and an ONU 820 (FIG. 8 shows only one OLT and one ONU as examples).

The OLT 810 may include a failure detecting unit 830. The failure detecting unit 830 includes an exception monitoring unit 840, a receiving unit 850, and an exception analyzing unit 860. The exception monitoring unit 840 is configured to: detect the optical power of the received optical signal or detect the bit error rate of the received data, and determine whether the monitoring information of the OLT needs to be obtained according to the detected optical power or bit error rate. The exception monitoring unit 840 includes a detecting module 841. The detecting module 841 is configured to: detect the optical power of the optical signal from the ONU or detect the bit error rate of the received data, and determine the variation of the optical power according to the optical power or bit error rate. The detecting module 841 may be an optical power meter or a bit error rate measuring unit. The exception monitoring unit 840 also includes a judging module 842, which is configured to judge whether the optical power variation determined by the detecting module 841 exceeds the threshold. If the detecting module 841 detects any other parameter, the judging module 842 is configured to judge whether the other parameter determined by the detecting module 841 exceeds the threshold. If the threshold is exceeded, the judging module 842 triggers a sending module 843. The sending module 843 is configured to send a monitoring information request to the ONU 820, requesting the ONU to send monitoring information. The monitoring information includes the following information or any combination thereof: transmit optical power of the laser, temperature, bias current, drive current, receive optical power, bit error rate, and alarm information. The receiving unit 850 is configured to receive the monitoring information sent by the ONU. The exception analyzing unit 860 is configured to analyze whether the PON system is abnormal according to the monitoring information sent by the ONU and the monitoring information of the OLT.

In practice, a PON system generally includes more than one ONU, and the OLT analyzes whether the PON system is abnormal in view of the local monitoring information of the OLT and the monitoring information sent by multiple ONUs. The analysis may be made for the ONUs in turn, or by traversing the link on which each ONU is located, or by analyzing the links of multiple ONUs comprehensively before an analysis result is obtained.

Embodiment 5

Figure 9:
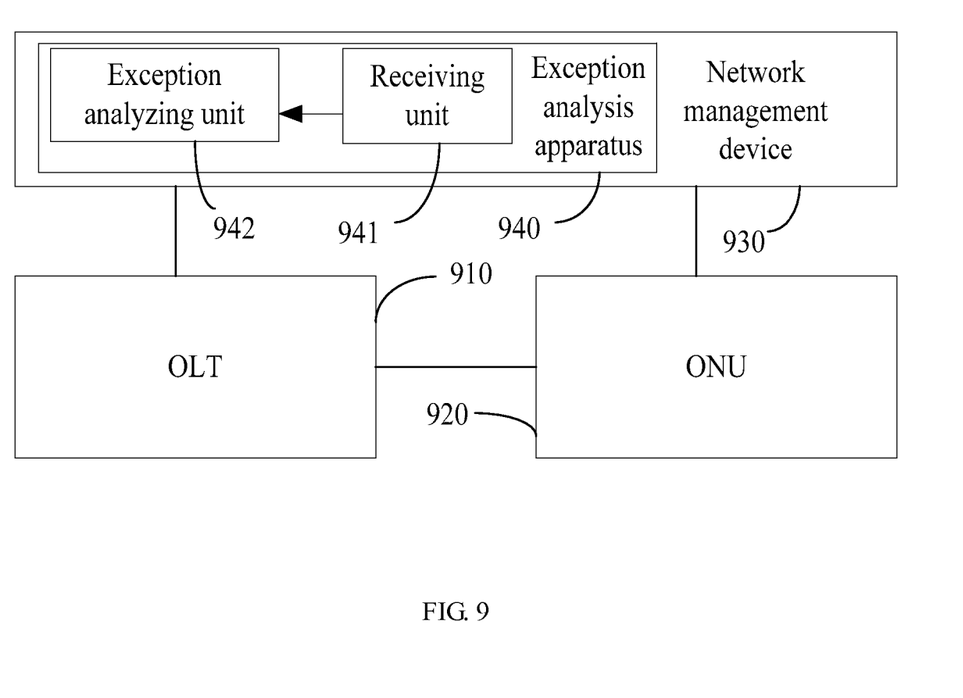
FIG. 9 shows a PON system in a fifth embodiment of the present invention.

As shown in FIG. 9, a PON system is provided in this embodiment. The PON system includes an OLT 910, an ONU 920, and a network management device 930. The network management device 930 is connected to the ONU 920 and the OLT 910, and includes an exception analyzing apparatus 940. The exception analyzing apparatus 940 includes: a receiving unit 941, configured to receive the monitoring information sent by the ONU 920 and the OLT 910; and an exception analyzing unit 942, configured to analyze whether the PON system is abnormal according to the monitoring information sent by the ONU 920 and the monitoring information sent by the OLT 910. The network management device may obtain the monitoring information of the OLT and the ONU in this way: The OLT and the ONU report the monitoring information actively; or, the network management device requests the monitoring information from the OLT and the ONU. Active reporting by the OLT and the ONU means that: Trigger conditions, such as the optical power threshold and bit error rate threshold, are set at the OLT and the ONU; when the monitoring information exceeds the threshold defined by the trigger conditions, the OLT and the ONU actively report the monitoring information to the network management device.

The requesting by the network management device means that: The network management device requests the OLT and the ONU to report the monitoring information periodically, or requests the OLT and the ONU when a preset condition is fulfilled, or requests the OLT and the ONU directly according to a management instruction.

The system supports all or part of the foregoing information obtaining modes concurrently.

Embodiment 6

Figure 10:
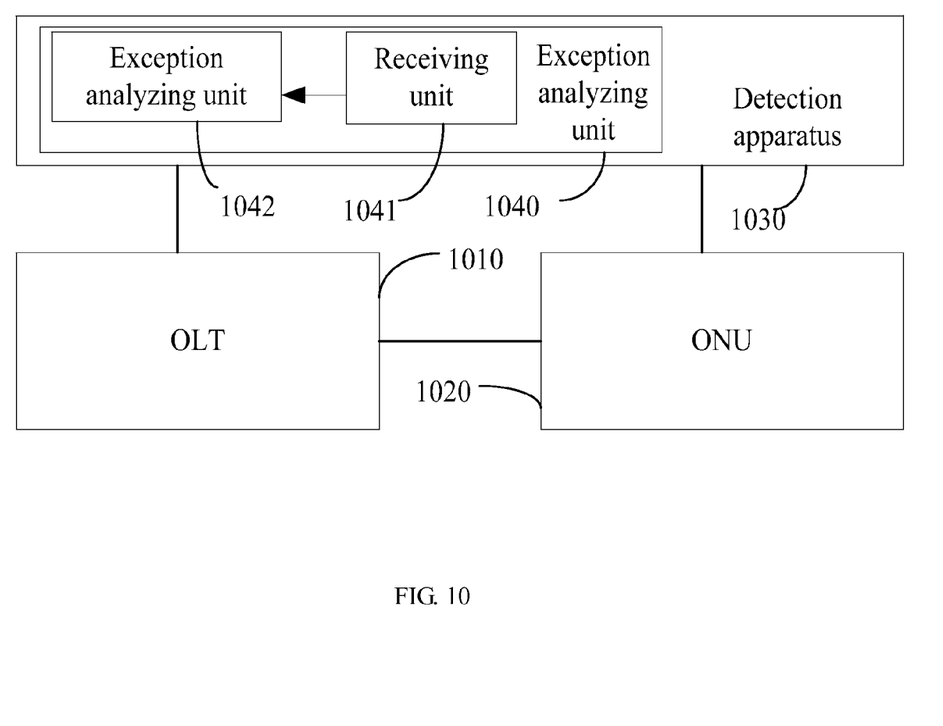
FIG. 10 shows a PON system in a sixth embodiment of the present invention.

A PON system is provided in this embodiment. As shown in FIG. 10, the PON system includes: an OLT 1010, an ONU 1020, and a detection apparatus 1030. The detection apparatus 1030 is a stand-alone device, and may be connected to the OLT and/or at least one ONU. The detection apparatus includes an exception analyzing unit 1040. The exception analyzing unit 1040 includes: a receiving unit 1041, configured to receive the monitoring information sent by the ONU and the OLT; and an exception analyzing unit 1042, configured to: analyze whether the PON system is abnormal according to the monitoring information of the ONU and the OLT received by the receiving unit, and analyze the failure. The receiving unit 1041 may receive the monitoring information from the OLT and the monitoring information from the ONU respectively; or the OLT forwards the received monitoring information of the ONU; or the ONU forwards the received monitoring information of the OLT. A judging unit may be set in the OLT and the ONU to determine whether to send the monitoring information of the OLT and the ONU to the exception analyzing unit when a preset condition is fulfilled.

According to the monitoring information, the exception analyzing unit analyzes whether the PON system is abnormal. Alternatively, the exception analyzing unit may further include a processing unit. The processing unit is configured to: judge whether the OLT and the ONU need to send respective monitoring information; if so, send a request to the OLT and the ONU, where the request requires the OLT and the ONU to send respective monitoring information to the exception analyzing unit; and trigger the receiving unit. The system provided in this embodiment may further include a network management device. The exception analysis apparatus may be connected to the network management device directly, and the network management device sends the obtained monitoring information of the OLT and the ONU to the exception analysis apparatus. The network management device may obtain the monitoring information of the OLT and the ONU in this way: The OLT and the ONU report the monitoring information actively; or, the network management device requests the monitoring information from the OLT and the ONU. Active reporting by the OLT and the ONU means that: Trigger conditions, such as the optical power threshold and bit error rate threshold, are set at the OLT and the ONU; when the monitoring information exceeds the threshold defined by the trigger conditions, the OLT and the ONU actively report the monitoring information to the network management device. The requesting by the network management device means that: The network management device requests the OLT and the ONU to report the monitoring information periodically, or requests the OLT and the ONU when a preset condition is fulfilled, or requests the OLT and the ONU directly according to a management instruction.

According to the embodiments of the present invention, by monitoring the optical power variation or another parameter, the monitoring information of the peer device can be obtained, for example, the OLT obtains the monitoring information of the ONU, before a failure triggers communication interruption. Therefore, the PON system failure can be pre-analyzed according to the monitoring information of the local device and the monitoring information of the peer device. In this way, the failure is discovered in time and removed quickly. Especially in some circumstances, for example, the failure cannot disappear automatically, manual analysis of the failure is avoided, and the OM costs of the PON system are slashed.

After reading the foregoing embodiments, those skilled in the art may understand that the present invention may be implemented through software in addition to a necessary universal hardware platform, or through hardware only. In most circumstances, it is better to implement the present invention through software in addition to a necessary universal hardware platform. Therefore, the essence of the technical solution under the present invention or the contributions to the prior art may be embodied as a software product. The software product is stored in a storage medium, and includes several instructions that enable one computer device, such as a personal computer, a server, or a network device, to perform the methods provided in the embodiments of the present invention.

Described above are exemplary embodiments of the present invention. In practice, those skilled in the art may make modifications to the method under the present invention to meet the specific requirements. Although the invention has been described through some exemplary embodiments, the invention is not limited to such embodiments.

What is claimed is:

1. A method for detecting failures of a Passive Optical Network (PON) system, comprising:
   monitoring first performance-related information at an Optical Line Terminal (OLT), the first performance-related information comprising a variation of optical power measured at the OLT;
   determining whether the variation of the optical power measured at the OLT exceeds a preset threshold;
   requesting, when the variation of the optical power measured at the OLT exceeds the preset threshold, an Optical Network Unit (ONU) to report second performance-related information monitored at the ONU; and
   determining a failure of the PON system according to the first performance-related information monitored at the OLT and the second performance-related information monitored at the ONU;
   wherein the first performance-related information monitored at the OLT further comprises: a transmit optical power of an OLT laser, a bias current of the OLT laser, a driven current of the OLT laser, a receive optical power measured at the OLT, and an uplink bit error rate (BER) measured at the OLT; and
   the second performance-related information comprises: a transmit optical power of an ONU laser, a bias current of the ONU laser, a drive current of the ONU laser, a receive optical power measured at the ONU, and a downlink bit error rate (BER) measured at the ONU;
   wherein the determining the failure of the PON system according to the first performance-related information monitored at the OLT and the second performance-related information monitored at the ONU comprises:
   calculating an uplink optical attenuation and a downlink optical attenuation of an optical channel between the OLT and the ONU based on the first performance-related information and the second performance-related information;
   determining that a connection failure occurs when a difference between the downlink optical attenuation and the uplink optical attenuation is greater than a first predetermined value; and
   determining that a fiber bend occurs when the difference between the downlink optical attenuation and the uplink optical attenuation is less than a second predetermined value.

2. The method of claim 1, wherein the uplink optical attenuation is a difference between the transmit optical power of the ONU laser and the receive optical power measured at the OLT, and the downlink optical attenuation is a difference between the transmit optical power of the OLT laser and the receive optical power measured at the ONU.

3. A method for detecting failures of a Passive Optical Network (PON) system, comprising:
   monitoring first performance-related information at an Optical Line Terminal (OLT) the first performance-related information comprising a variation of optical power measured at the OLT;
   determining whether the variation of the optical power measured at the OLT exceeds a preset threshold;
   requesting, when the variation of the optical power measured at the OLT exceeds the preset threshold, an Optical Network Unit (ONU) to report second performance-related information monitored at the ONU; and
   determining a failure of the PON system according to the first performance-related information monitored at the OLT and the second performance-related information monitored at the ONU;

wherein the first performance-related information monitored at the OLT further comprises: a transmit optical power of an OLT laser, a bias current of the OLT laser, a driven current of the OLT laser, a receive optical power measured at the OLT, and an uplink bit error rate (BER) measured at the OLT; and the second performance-related information comprising: a transmit optical power of an ONU laser, a bias current of the ONU laser, a drive current of the ONU laser, a receive optical power measured at the ONU, and a downlink bit error rate (BER) measured at the ONU;

wherein the determining the failure of the PON system according to the first performance-related information monitored at the OLT and the second performance-related information monitored at the ONU comprises:

determining that the ONU laser of only one of the ONUs fails when the receive optical power measured at the OLT and the transmit optical power of all ONUs are normal but the uplink BER of said only one ONU increases; and determining a receiver of the OLT fails when the receive optical power measured at the OLT and the transmit optical power of all ONUs are normal but the uplink BERs of all the ONUs increase.

4. A Passive Optical Network (PON) system, comprising an Optical Line Terminal (OLT) and a plurality of Optical Network Units (ONUs), the OLT is connected to the ONUs through an Optical Distribution Network (ODN);

wherein the OLT is configured to monitor first performance-related information comprising a variation of optical power measured at the OLT, determine whether the variation of the optical power exceeds a preset threshold, request a corresponding ONU to report second performance-related information of the ONU when the variation of the optical power measured at the OLT exceeds the preset threshold, and determine a failure of the PON system according to the first performance-related information of the OLT and the second performance-related information of the ONU;

the ONU is configured to send the second performance-related information measured at the ONU to the OLT;

wherein the first performance-related information monitored at the OLT further comprises: a transmit optical power of an OLT laser, a bias current of the OLT laser, a driven current of the OLT laser, a receive optical power measured at the OLT, and an uplink bit error rate (BER) measured at the OLT; and the second performance-related information comprises: a transmit optical power of an ONU laser, a bias current of the ONU laser, a drive current of the ONU laser, a receive optical power measured at the ONU, and a downlink bit error rate (BER) measured at the ONU;

wherein OLT determines the calculating an uplink optical attenuation and a downlink optical attenuation of an optical channel between the OLT and the ONU based on the first performance-related information and the second performance-related information; determines that a connection failure occurs when a difference between the downlink optical attenuation and the uplink optical attenuation is greater than a first predetermined value; and determines that a fiber bend occurs when the difference between the downlink optical attenuation and the uplink optical attenuation is less than a second predetermined value.

5. The PON system of claim 4, wherein the uplink optical attenuation is a difference between the transmit optical power of the ONU laser and the receive optical power measured at the OLT, and the downlink optical attenuation is a difference between the transmit optical power of the OLT laser and the receive optical power measured at the ONU.

6. The PON system of claim 4, wherein the OLT determines that the ONU laser of only one of the ONUs fails when the receive optical power measured at the OLT and the transmit optical power of all ONUs are normal but the uplink BER of said only one ONU increases; and determines a receiver of the OLT fails when the receive optical power measured at the OLT and the transmit optical power of all ONUs are normal but the uplink BERs of all the ONUs increase.

* * * * *